United States Patent
Khan et al.

(10) Patent No.: US 9,444,515 B2
(45) Date of Patent: Sep. 13, 2016

(54) SHORT-RANGE ZIGBEE COMPATIBLE RECEIVER WITH NEAR-THRESHOLD DIGITAL BASEBAND

(71) Applicant: The Regents of The University of Michigan, Ann Arbor, MI (US)

(72) Inventors: Osama U. Khan, Berkeley, CA (US); David D. Wentzloff, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/695,387

(22) Filed: Apr. 24, 2015

(65) Prior Publication Data

US 2015/0311946 A1    Oct. 29, 2015

Related U.S. Application Data

(60) Provisional application No. 61/984,316, filed on Apr. 25, 2014.

(51) Int. Cl.
*H04L 7/00* (2006.01)
*H04B 1/7073* (2011.01)
(Continued)

(52) U.S. Cl.
CPC ............ *H04B 1/7073* (2013.01); *H04L 25/40* (2013.01); *H04W 4/008* (2013.01); *H04W 24/02* (2013.01); *H04W 24/08* (2013.01); *Y02B 60/50* (2013.01)

(58) Field of Classification Search
CPC ... H04L 7/0337; H04L 7/0334; H04L 7/091; H04L 7/033; H04L 7/0029; H04L 7/0008
USPC ............... 375/130–153, 224–227, 316–352, 375/354–376
See application file for complete search history.

(56) References Cited

U.S. PATENT DOCUMENTS

| | | | | |
|---|---|---|---|---|
| 7,907,555 B1* | 3/2011 | Sankabathula | ... | H04W 52/0245 370/284 |
| 2002/0080898 A1* | 6/2002 | Agazzi | ............... | H03M 1/0624 375/355 |

(Continued)

FOREIGN PATENT DOCUMENTS

| EP | 1635331 A1 | 3/2006 |
|---|---|---|
| EP | 2467984 A2 | 6/2012 |
| WO | WO-2010143756 A2 | 12/2010 |

OTHER PUBLICATIONS

S. Lanzisera et al "Reducing Average Power in Wireless Sensor Networks Through Data Rate Adaptation", IEEE ICC, 978-1-4244-3435 (2009).

*Primary Examiner* — James M Perez
(74) *Attorney, Agent, or Firm* — Harness, Dickey & Pierce, PLC

(57) ABSTRACT

An 8.1 nJ/bit 2.4 GHz receiver with integrated digital baseband supporting Q-QPSK DSSS modulation compliant with the IEEE 802.15.4 standard is presented that targets short-range, Internet of Things applications (IoTs). The sensitivity of a wireless communication receiver in general trades with power consumption. This receiver exploits this tradeoff to achieve a total power consumption of 2.02 mW including ADCs and digital baseband processing, at a sensitivity of −52.5 dBm at 250 Kbps. The energy-efficiency of the radio frequency (RF) front-end alone is nearly two times better than the prior art. The receiver was fabricated in 65 nm CMOS with an area of 0.86 mm$^2$.

17 Claims, 17 Drawing Sheets

(51) Int. Cl.
*H04L 25/40* (2006.01)
*H04W 4/00* (2009.01)
*H04W 24/02* (2009.01)
*H04W 24/08* (2009.01)

(56) References Cited

U.S. PATENT DOCUMENTS

| | | | |
|---|---|---|---|
| 2004/0110510 A1 | 6/2004 | Jeon et al. | |
| 2005/0195920 A1* | 9/2005 | Gierl | H04B 1/28 375/316 |
| 2006/0104339 A1* | 5/2006 | Langberg | H04B 17/0085 375/222 |
| 2006/0188040 A1* | 8/2006 | Vis | G11B 20/10009 375/340 |
| 2006/0193371 A1* | 8/2006 | Maravic | H03H 17/0213 375/130 |
| 2006/0222130 A1* | 10/2006 | Dominique | H04L 1/20 375/355 |
| 2009/0279650 A1* | 11/2009 | Qian | H04L 27/3881 375/355 |
| 2009/0311985 A1 | 12/2009 | Youssoufian et al. | |
| 2011/0096875 A1* | 4/2011 | Amrutur | H04B 1/1027 375/343 |
| 2012/0257558 A1* | 10/2012 | Shin | H04W 52/0229 370/311 |
| 2012/0257897 A1* | 10/2012 | Hu | H04B 10/548 398/76 |
| 2013/0019685 A1 | 1/2013 | Sakaguchi et al. | |
| 2013/0243069 A1* | 9/2013 | Guo | H04L 25/03891 375/232 |
| 2014/0241157 A1* | 8/2014 | Tan | H04J 3/0638 370/235 |
| 2015/0282068 A1* | 10/2015 | Rajagopal | H04W 52/0206 370/350 |

* cited by examiner

SHORT-RANGE ZIGBEE COMPATIBLE RECEIVER WITH NEAR-THRESHOLD DIGITAL BASEBAND

CROSS-REFERENCE TO RELATED APPLICATIONS

This application claims the benefit of U.S. Provisional Application No. 61/984,316, filed on Apr. 25, 2014. The entire disclosure of the above application is incorporated herein by reference.

GOVERNMENT CLAUSE

This invention was made with government support under CCF0910765 awarded by the National Science Foundation. The Government has certain rights in the invention.

FIELD

The present disclosure relates to a short-range wireless receiver with near-threshold digital baseband.

BACKGROUND

An exponential growth in miniaturized smart sensors is imminent in the near future. The rapid growth in technology is bringing the vision of Internet of Things (IoTs) closer to reality at a much faster pace than previously anticipated. This value does not come by connecting every object to the internet but by their intelligent interaction and collaboration. This will open new dimensions of collecting data and extracting information at a scale not possible before. This technology will enable smart cities with improved waste/water management, transportation and lighting, connected cars with smart homes and will revolutionize retail, manufacturing, shopping and healthcare.

The sensor density around a person is expected to increase from a few hundreds to thousands, which will correspond to roughly a trillion networked sensors on the planet. The microsystems encompassing these sensors will have to have high-energy efficiency for computation, communication and sensing operations. This is mainly because many of these microsystems are expected to operate at the edge of the cloud with a battery lifetime of 10+ years, or batteryless operation from harvested energy. This poses new design challenges and opportunities for circuit designers and especially for wireless communication Integrated Circuits (ICs) as they consume a significant amount of power when active in a miniaturized microsystem.

Some efforts are put in place to define an open platform that enables the Internet of Things such as 6LoWPAN-based networks built on the IEEE 802.15.4 standard. Recently, IEEE 802.15.4 compliant radio frequency (RF) front-ends have been reported with exceptional sensitivity (wireless range>100 m) and energy efficiency of 7.2 nJ/bit, 6.8 nJ/bit and 7.4 nJ/bit.

However, there are many IoT applications that only require short-range communication (<10 m), such as wireless proximity sensors for smart meters and parking spaces, home automation within a room, and some wearables for fitness and health monitoring. In these cases, different design tradeoffs can be made in order to improve energy efficiency, as compared to devices that prioritize high performance or ICs designed for worst-case applications. In particular, it is well known that the sensitivity of a receiver directly trades off with its power consumption. Dialing sensitivity back to around −50 dBm could lower the power of the radio significantly and meet the needs of many energy-constrained applications. However, doing so is not trivial, and requires redesigning with focus on ultra-low power from RF front-end through the digital baseband processor.

This disclosure presents a fully integrated 2.4 GHz receiver comprising an RF front-end, analog-to-digital converter (ADCs), and digital baseband processor (DBB) that exploit the relationship of sensitivity and power consumption by adapting the sampling and processing rates of signals in the radio baseband processor. Although not meeting the sensitivity required by the IEEE 802.15.4 standard, this receiver provides a short-range O-QPSK DSSS link that is fully compatible with IEEE 802.15.4 packets. While reference is made throughout this disclosure to a particular standard, it is readily understood that the concepts described herein are applicable more generally to short-range wireless receivers.

This section provides background information related to the present disclosure which is not necessarily prior art.

SUMMARY

This section provides a general summary of the disclosure, and is not a comprehensive disclosure of its full scope or all of its features.

A method is provided for operating a short-range receiver with a digital baseband processor. The method includes: receiving a network data packet over a data link of a wireless network; sampling a portion of the network data packet (e.g., header) at a given sampling rate (e.g., Nyquist rate); determining a metric indicative of quality of the data link over which the network data packet was received; lowering the given sampling rate of the network data packet to a reduced sampling rate, where the reduced sampling rate is set inversely to quality of the data link and with a value lower than the given sampling rate; and processing remainder of the network data packet at the reduced sampling rate.

In one embodiment, the metric is compared to a threshold, the given sampling rate is reduced to the reduced sampling rate and the remainder of the network data packet is processed when the metric is above a threshold; whereas, the remainder of the data unit is processed at the given sampling rate when the metric is below the threshold.

Lowering the given sampling rate may be implemented by disabling one of the digital baseband process, an analog-to-digital converter or another active circuit in the receiver for a period of time within the sampling interval.

In some embodiments, lowering the given sampling rate includes ranking samples from the portion of the network data packet according to energy level; selecting a subset of the samples having highest energy level, where the number of selected samples correlates to the reduced sampling rate; and sampling the remainder of the network data packet in accordance with the selected subset of samples.

In some embodiments, the metric indicative of quality of the data link may be selected from a group comprised of a signal-to-noise ratio, a received signal strength index and a link quality indicator.

In one aspect of this disclosure, the method for operating a short-range receiver can be further defined as follows. The method includes: receiving, by the receiver, a protocol data unit over a channel in a wireless network; sampling, by the receiver, a portion of the data unit at a given sampling rate; determining, by the receiver, a metric indicative of quality the channel over which the data unit was received; comparing, by the receiver, the metric to a threshold; processing the remainder of the data unit at a reduced sampling rate when the metric is above the threshold; and processing the remainder of the data unit at the given sampling rate when the metric is below the threshold. Processing of the data unit further includes ranking samples from the portion of the data unit according to energy level; selecting a subset of the samples having highest energy level, where the number of selected samples correlates to the reduced sampling rate; and sampling the remainder of the network data packet in accordance with the selected subset of samples.

In another aspect of this disclosure, a short-range receiver is provided. The receiver includes: an RF front-end circuit, and analog-to-digital converter and a digital baseband processor. The RF front-end circuit is configured to receive an RF analog signal from an antenna and operates to shift the RF analog signal to an intermediate signal having a different frequency. The analog-to-digital converter is configured to receive the intermediate signal from the RF front-end circuit and convert the intermediate signal to a digital signal. The digital baseband processor is configured to receive the digital signal from the analog-to-digital converter and processes the digital signal at a prescribed sampling rate. More specifically, the baseband processor includes a link quality module that determines a metric indicative of quality of data link over which the RF analog signal was received and set the prescribed sampling rate to a value that is inversely related to the quality of the data link; and a decoder that samples the digital signal at the prescribed sampling rate and outputs a sequence of data bits derived from the digital signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 14:
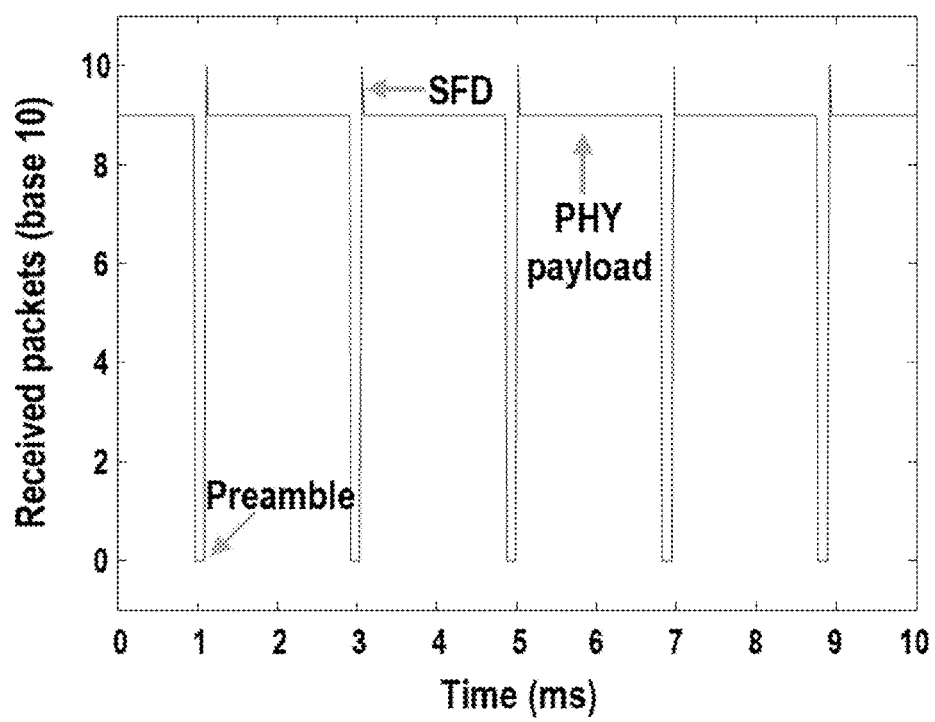
Figures 15A, 15B:
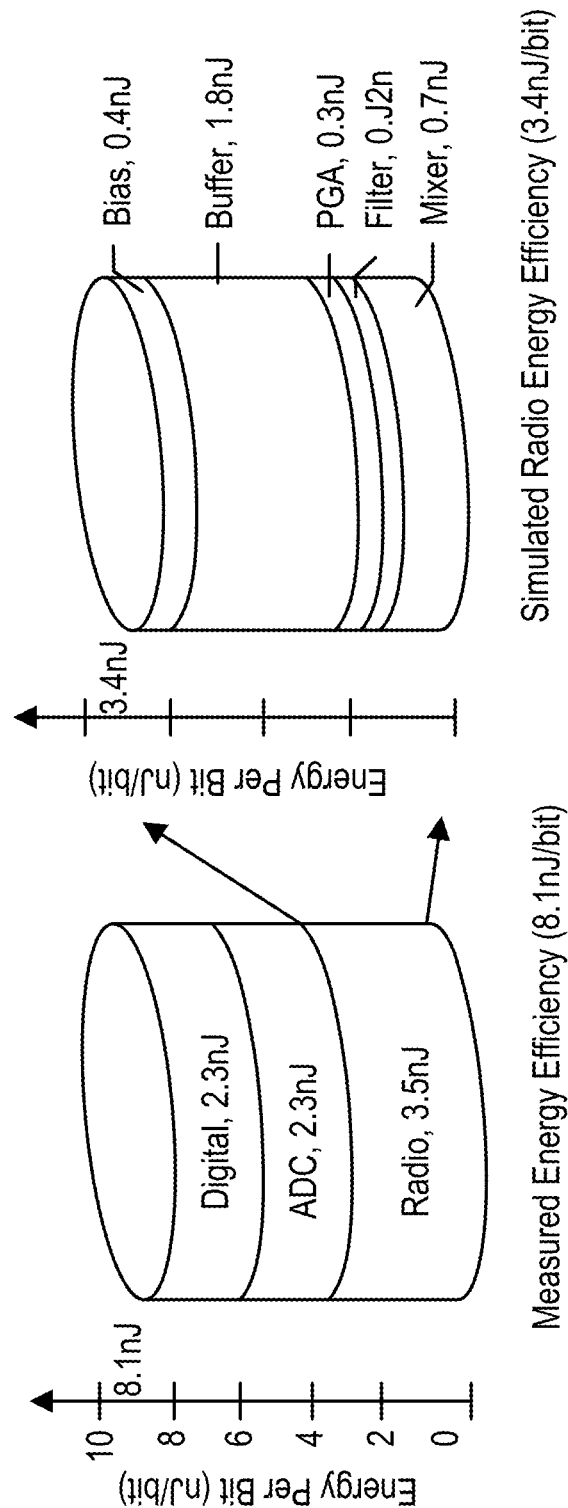
Figure 15C:
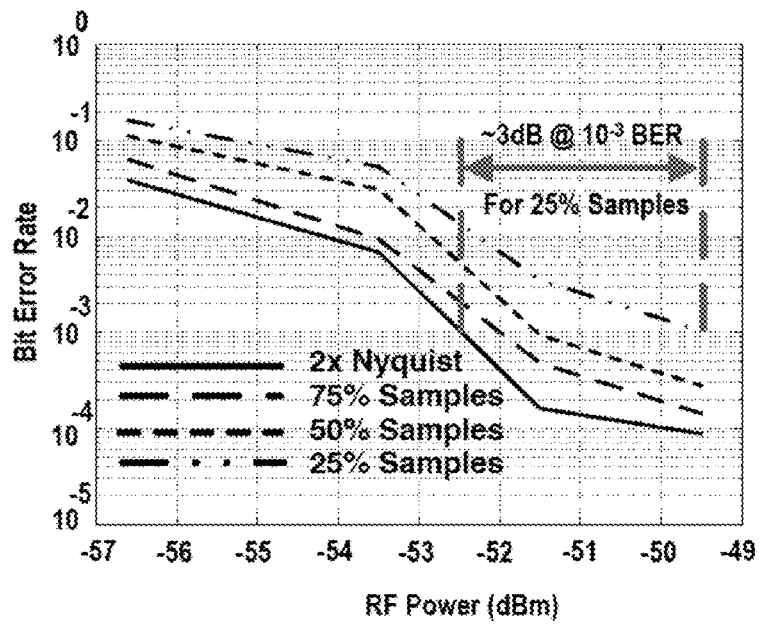
Figure 15D:
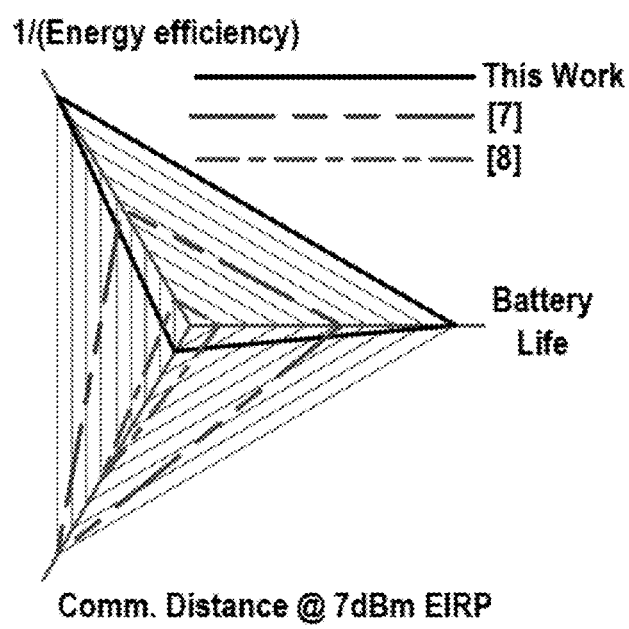
Figure 16:
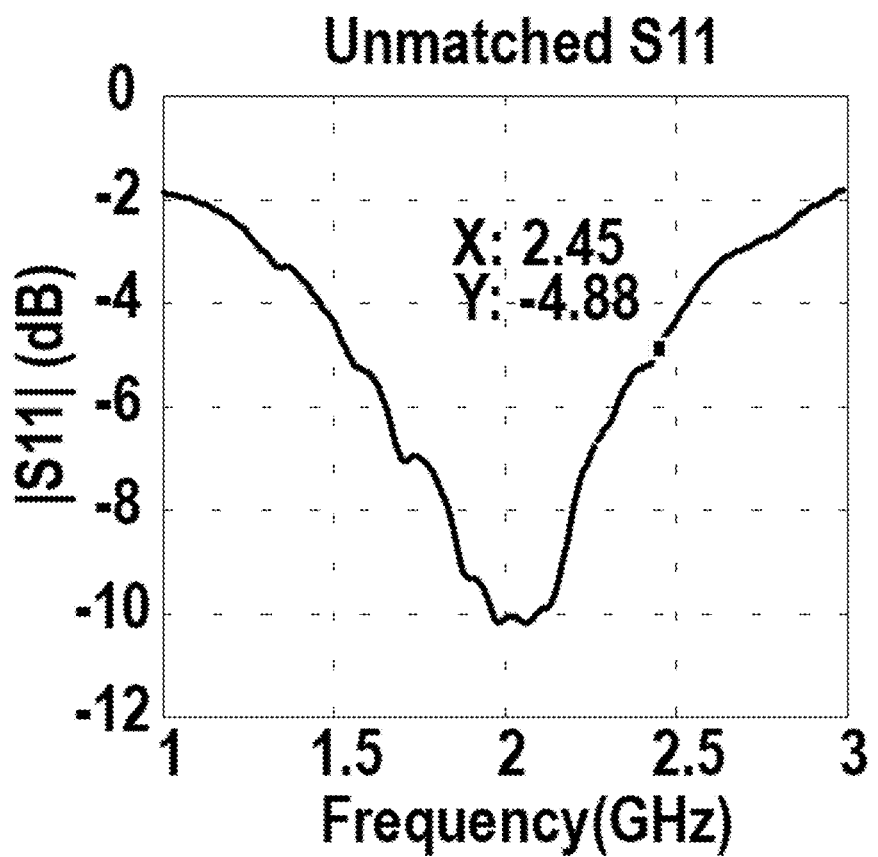

FIG. 14 is a graph showing measured received RF packets compliant with the IEEE 802.15.4 packet format, each packet is of duration 2 ms; and FIGS. 15A-15D are graphs showing measured energy per bit profile along with simulated energy efficiency breakdown of the radio, Bit Error Rate and the radar plot of the system, respectively; and FIG. 16 is a graph showing measured S11 (without impedance matching) at the RF input.

Corresponding reference numerals indicate corresponding parts throughout the several views of the drawings.

DETAILED DESCRIPTION

Example embodiments will now be described more fully with reference to the accompanying drawings.

Figure 1:
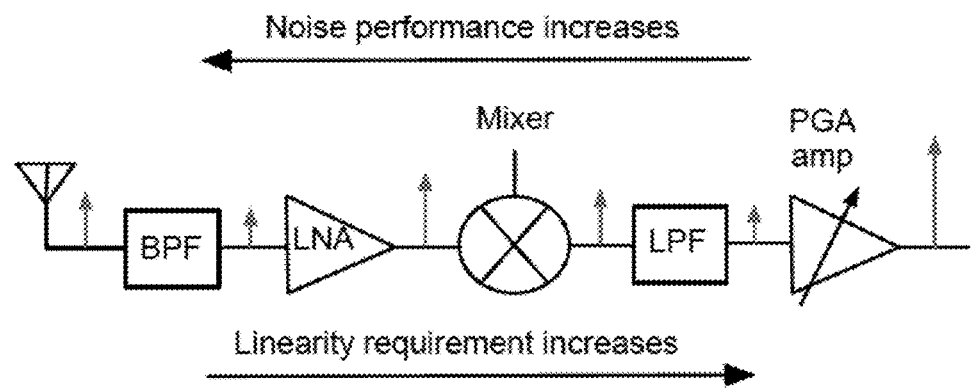
FIG. 1 is a diagram showing a signal propagation through a generic radio front-end.

To understand system design tradeoffs for RF receivers consider a generic radio front-end as shown in FIG. 1 where a sine wave is represented as an impulse in the frequency domain that progresses through the receiver chain. A parameter of interest of a receiver is its dynamic range which is determined by the maximum signal handling capability and the minimum detectable signal for a given performance specification. To maximize the dynamic range of a radio receiver for a given power budget, the power is traded to optimize different circuit parameters along the signal chain. The minimum detectable signal specification of a receiver depends on its noise performance while the maximum in-band signal handling capability is related to the overall linearity of the receiver. The noise performance of the front-end blocks is more critical compared to the later stages in a signal chain. Intuitively this can be understand, as the signal goes through amplification, the noise added by the later stages has less relative impact to degrade the overall signal to noise ratio as compared to the front-end blocks. Similarly, as the signal goes through amplification in a signal chain the linearity requirements of the later stages become more critical (since handling larger amplitude signals) as compared to the front-end blocks. The noise, linearity and power tradeoffs are analyzed more quantitatively.

High performance and high sensitivity receivers (sensitivity<−90 dBm) require a low receiver Noise Figure (NF). This is achieved by employing a Low Noise Amplifier (LNA) at the front of the signal-processing path, followed by additional RF gain stages and an active mixer. The LNA noise figure typically dominates the receiver overall noise figure and trades directly with power. The noise factor (F) of an LNA is related to its power approximately by, $$F \approx 1 + \frac{\alpha}{P_{LNA}} \quad (1)$$

where $P_{LNA}$ is the power consumed by a low-noise amplifier and $\alpha$ is the proportionality constant that depends on the given technology and the circuit topology.

Figure 2:
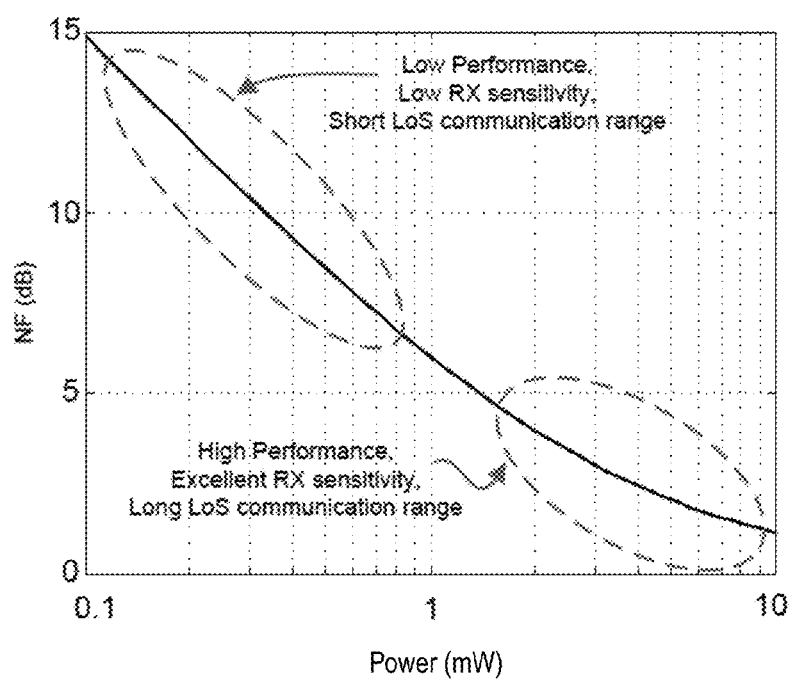
FIG. 2 is a graph showing theoretical noise figures vs. power tradeoff in an LNA.

FIG. 2 plots the Noise Figure ($10 \log_{10} F$) from (1) for an LNA designed in 90 nm CMOS, which consumes 3 mW power and achieves a NF of 3 dB. A similar relationship between noise and power is expected for an LNA implemented in 65 nm CMOS and in fact for any signal-processing element trying to optimize noise and power. As expected for low NF<5 dB, the rate of change of noise figure with respect to power is decreasing (decreasing gradient) suggesting lower returns in noise figure for increasing power. Whereas for systems that can tolerate a high noise figure the power can be reduced significantly, as the rate of change of noise figure with respect to power is high (large slope). Since noise figure directly dictates receiver sensitivity, this region corresponds to a low-sensitivity and short-range wireless communication. This is the first design tradeoff that has been explored for the prototype chip.

Figure 3:
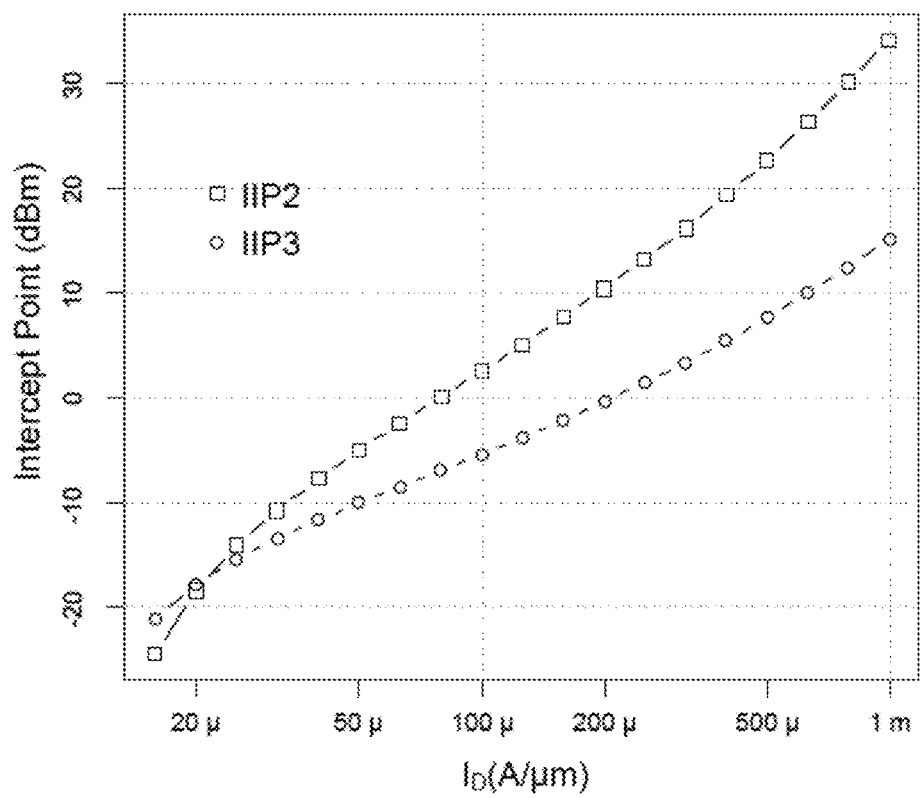
FIG. 3 is a graph showing theoretical short-channel NFET linearity vs. power tradeoff in 65 nm CMOS.

The overall linearity of the RF front-end is dictated by the baseband gain stages. To better understand the linearity vs. power tradeoff, a three-point method is adopted to estimate the linearity of a short-channel NFET in 65 nm CMOS. For a zero-IF receiver architecture second-order linearity is more important and the same method is used to estimate IIP2.

$$IIP3 = \frac{4V^2}{Rs}\left[\frac{g(0)}{g*V(+g(-V)-2g(0))}\right] \quad (2)$$

$$IIP2 = \frac{32V^2}{Rs}\left[\frac{g(0)}{g(V)-g(-V)}\right]^2 \quad (3)$$

where IIP2, IIP3 are the second and third order input intercept points respectively, g is the incremental device gain evaluated at three input voltages 0, V and −V, and Rs is the source resistance. The incremental gain of a short-channel MOSFET is given by, $$g = \left[\frac{1+\rho/2}{(1+\rho)^2}\right]\left[\mu_n C_{ox}\frac{W}{L}V_{od}\right] \quad (4)$$

$$\rho = \frac{V_{od}}{LE_{sat}} \quad (5)$$

where $V_{od}$ is the over-drive voltage and ρ takes velocity saturation into account. The $V_{od}$ depends only on the current density therefore both IIP3 and IIP2 are plotted vs. current density, to estimate power in 65 nm CMOS as shown in FIG. 3. As shown in the plot, the linearity improves as the power increases logarithmically. Therefore the baseband gain stages in the proposed receiver are biased with a current density <50 μA/μm to keep the total power consumption low while achieving decent linearity.

Figure 4:
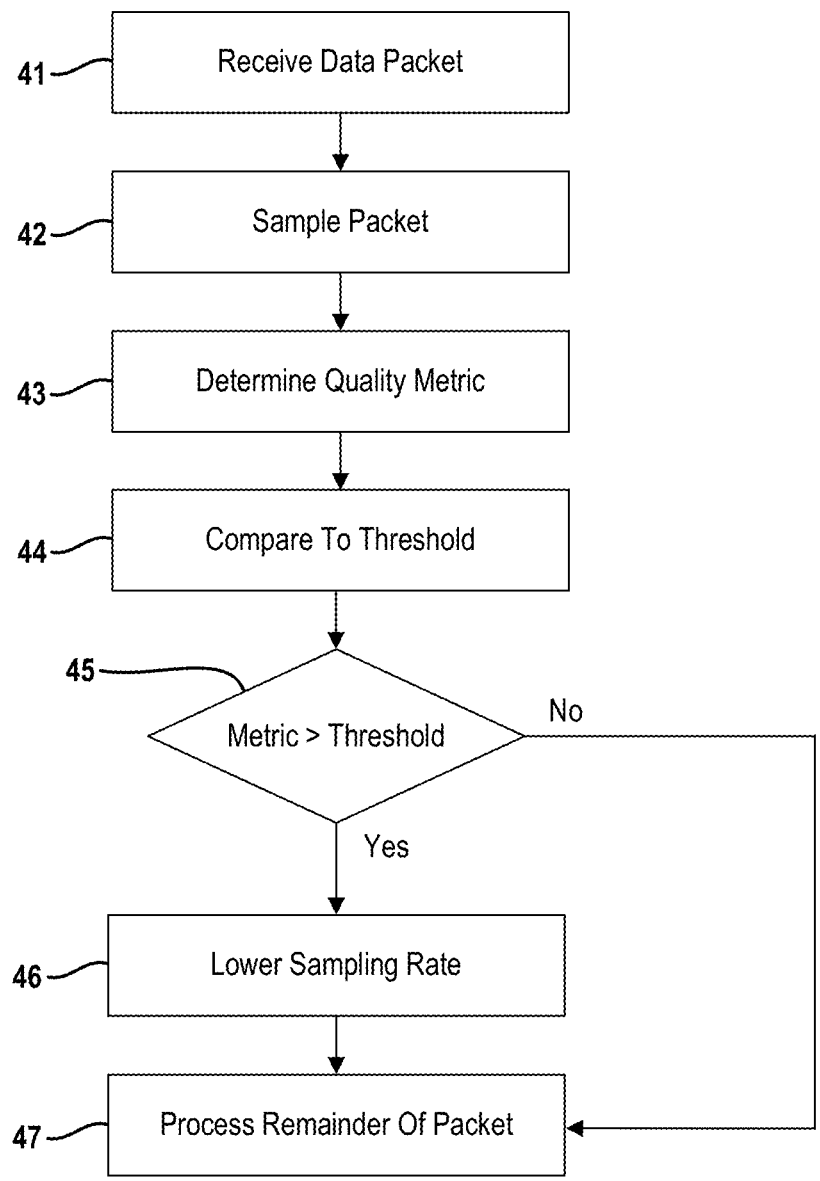
FIG. 4 is a flowchart illustrating a proposed adaptive sampling technique.

Apart from the sensitivity vs. power tradeoff, applicant proposes an adaptive sampling method for operating the receiver as seen in FIG. 4. In an example embodiment, incoming data is processed on a packet-by-packet basis by the receiver. Upon receiving a network data packet at 41, a portion of the data packet is sampled at 42 at a standard sampling rate, such as twice Nyquist rate. In one embodiment, the header of the data packet is sampled at the standard sampling rate although other portions of the packet may be used in lieu of the header. It is understood that the standard sampling rate may differ depending on the target or desired link performance.

From the sampled data, a quality metric is determined at 43, where the quality metric is indicative of quality of the data link over which the network data packet was received. In the example embodiment, signal-to-noise ratio is used as the quality metric. Other types of quality metrics are contemplated by this disclosure including a received signal strength index and a link quality indicator.

To save power, the receiver can be operated at a lower sampling rate while maintaining link performance. In a simplified example, the quality metric is compared at 45 to a threshold. When the quality metric exceeds the threshold, the sampling rate can be lowered at 46, thereby reducing power consumption. For example, the sampling rate can be set at 50% or 25% of the standard rate. In other words, the sampling rate is set inversely to the quality of the data link. The remainder of the data packet is then processed at the reduced sampling rate as indicated at 27. The reduced sampling rate can be implemented in different ways as further described below.

When the quality metric is less than or equal to the threshold, the sampling rate remains the same and the remainder of the data packet is processed at the standard sampling rate. Upon receiving another data packet, the process is repeated as indicated at 48. In this way, adaptive sampling is performed on a packet-by-packet basis. It is to be understood that only the relevant steps of the methodology are discussed in relation to FIG. 4, but that other functions may be needed to control and manage the overall operation of the receiver.

In a variant of this method, processing of additional data packets continues at the reduced sampling rate until the quality of the data link changes. That is, the quality of the data link is monitored by the receiver. Upon detecting a change in the quality of the data link, the sampling rate is set in the manner set forth above.

Figure 5:
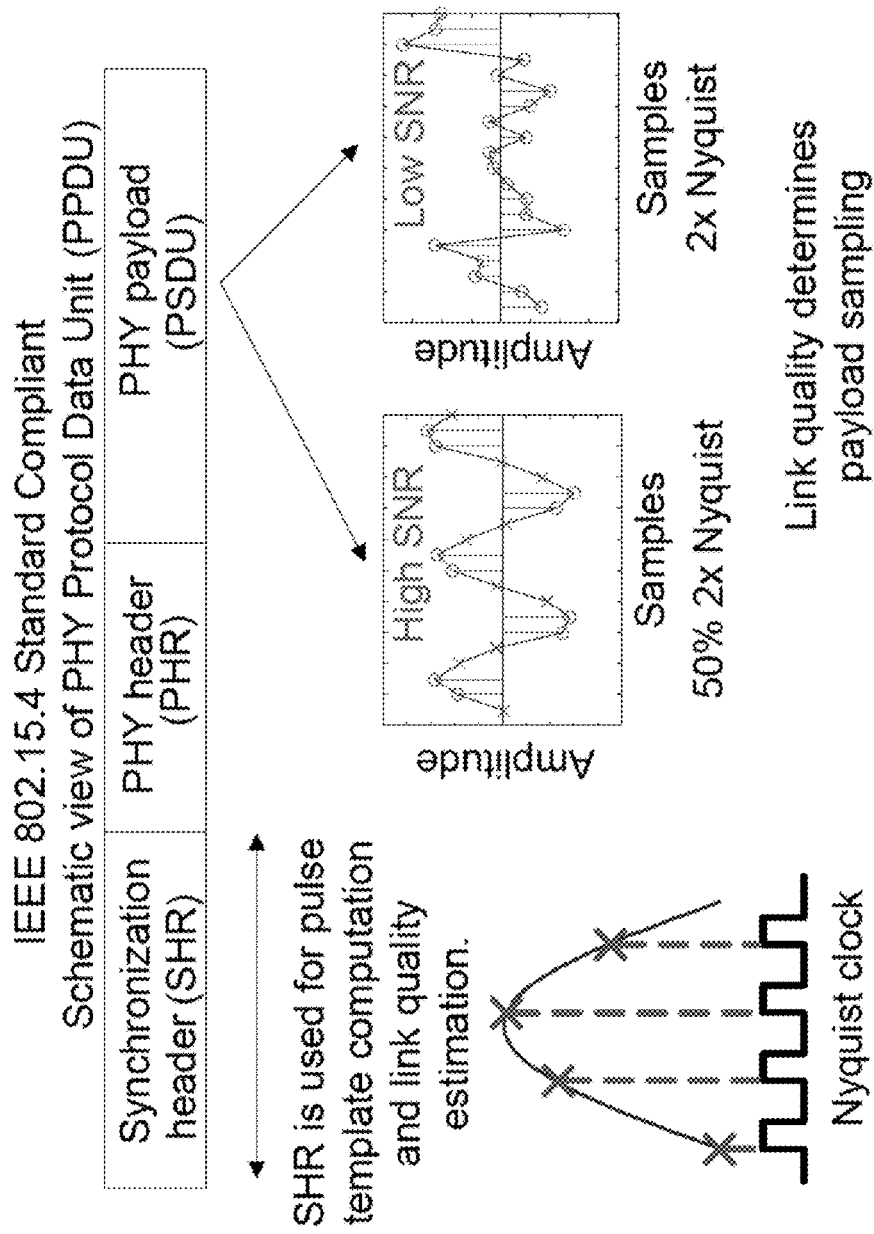
FIG. 5 is a diagram further illustrating the adaptive sampling technique.

FIG. 5 conceptually illustrates this method for an IEEE 802.15.4 standard compliant packet. For this example standard, the chips are half-sine shaped pulses. The channel pulse template is learned by averaging the received known pulses in the synchronization header of a protocol data unit (PPDU). As shown in the illustrative graphic, if the SNR is low, the receiver is run at 2× the Nyquist rate while if the SNR is high, the receiver is run at 1× the Nyquist sampling rate. Independent of the sampling rate the receiver maintains a fixed system link performance quantified by a target bit-error-rate (BER). In other words, the sensitivity of the receiver is adapted to the time-varying characteristic of the communication channel on a per-packet basis. This design tradeoff is in direct contrast to what high-performance radios typically employ. In the case of an IEEE 802.11 (WiFi) standard compliant radio, a provision is made in the standard to adapt to higher modulation schemes when a good communication channel exists, preferring high data-throughput and thus high-performance over low power consumption. While reference is made to a particular IEEE standard, it is readily understood that the broader aspects of this disclosure are applicable to other wireless communication protocols as well.

Rather than arbitrarily selecting samples at the reduced sampling rate, samples are selected in a particular manner. In the example embodiment, once the averaged channel pulse template is learned, samples are ranked with respect to energy level and this information is later used for adapting the average sampling rate. More specifically, a subset of samples (having the highest energy level) is selected and the remainder of the data packet is sampled in accordance with the subset of samples. With continued reference to FIG. 5, for a 50% sampling rate, two of four samples are chosen from each pulse. In this example, the second and third pulses have the highest energy value and thus are chosen while lowest two energy samples are not taken into account for further digital processing. It is noted that the reduced sampling rate remains uniform. For a 25% sampling rate, only the third pulse would be used for subsequent processing. In this case, the reduced sampling rate is non-uniform.

In one embodiment, the digital baseband processor will only process the selected samples and cease operating for the other samples. In the case of the 25% sampling rate, the digital baseband processor would process the third pulse but not the other three pulses. Likewise, other components of the receiver can be disabled for a period of time within a sampling interval according the reduced sampling rate. For example, an analog-to-digital converter can be disabled except to process the third pulse in the case of a 25% sampling rate. One or more other active circuits, such as amplifiers, filter, oscillators, etc., can also be disabled for a period of time within the sampling interval on a per-sample basis according to the reduced sampling rate. It is also understood one or more of these steps can be taken in combination to reduce power consumption.

Figure 6:
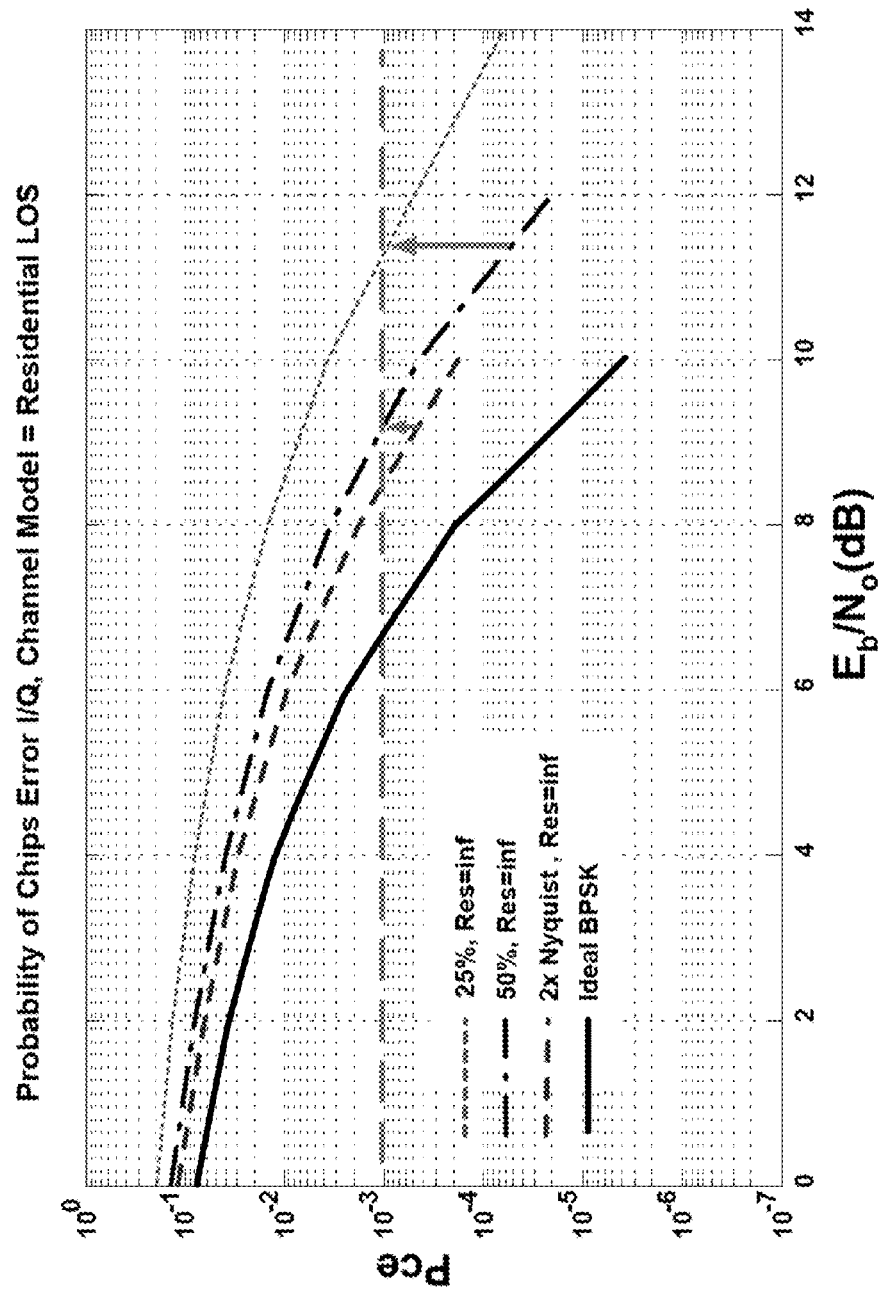
FIG. 6 is a graph depicting a simulated probability of chip error rate.

To evaluate the link performance using the proposed adaptive sampling, a MATLAB simulation model was developed. FIG. 6 shows the waterfall curves for four different sampling rates: 25%, 50%, 75% and the standard sampling rate. For a target link performance of $10^{-3}$ BER, the receiver is run at a standard sampling rate of 2× the Nyquist rate for acquisition, synchronization and channel pulse template estimation. If the input $E_b/N_o$ is >9 dB, then the receiver can switch to 50% sampling rate and if the $E_b/N_o$ is >11 dB, then the receiver can switch to 25% sampling rate. In each case, the reduced sampling rate maintains the $10^{-3}$ BER link performance as shown in the figure. The 25% sampling rate would correspond to one out of four samples per pulse for the prototype chip. Once the sampling rate is selected, the receiver determines the highest energy samples on the channel pulse template, and these same time samples are used for processing the entire PHY payload (PSDU) in the PPDU packet.

Figure 7:
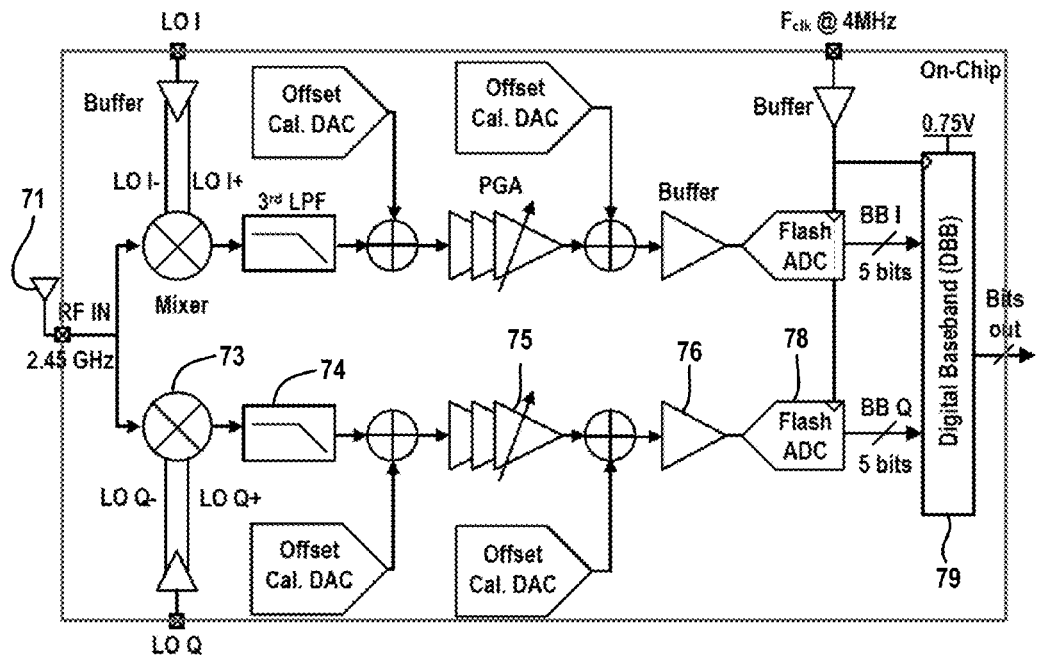
FIG. 7 is system block diagram of 2.4 GHz O-QPSK DSSS receiver with near-threshold digital baseband.

FIG. 7 is a system block diagram for an example receiver 70. The receiver 70 is comprised generally of an RF front-end circuit 72, an analog-to-digital converter 78, and a digital baseband processor 79. In an example embodiment, the receiver is compatible with IEEE 802.15.4 RF packets apart from sensitivity and outputs the raw binary bits transmitted. The coherent direct-conversion RF front-end circuit 72 is configured to receive an RF analog signal from an antenna 71 and operates to shift the RF analog signal to an intermediate signal having a different frequency. The analog-to-digital converter 78 in turn receives the intermediate signal from the RF front-end circuit 72 and convert the intermediate signal to a digital signal. The RF front-end circuit 72 and two 5-bit flash ADCs operate at a 1 V analog supply while dissipating 0.87 mW and 0.57 mW, respectively. The digital baseband processor is configured to receive the digital signal from the analog-to-digital converter 78 and processes the digital signal at a prescribed sampling rate. The digital baseband processor typically comprises the signal processing required to acquire, synchronize, and demodulate information from the received signals, and perform further processing on the received packet according to the structure of the packet often defined by a standard. This includes feedback control signals to the analog front-end circuits. The digital baseband processor could also be described as a modem, a digital signal processor, or a radio controller such as a simple state machine. In the example embodiment, the digital baseband processor operates at a scaled supply voltage of 0.75 V, slightly above the device threshold voltage, while dissipating only 0.58 mW. The digital baseband processor power can be further reduced by 8% by implementing the adaptive sampling method described above.

In the example embodiment, an RF signal at 2.45 GHz is directly fed into an active Gilbert cell based mixer 73 and quadrature down-converted to baseband. Channel selection is performed by a third-order Butterworth gm-C active low-pass filter 74 with a corner frequency of 1.5 MHz. The filtered baseband signal is then amplified by three Programmable Gain Amplifiers (PGAs) 75 and followed by a buffer 76 which drives the input of the flash ADC. The 5-bit flash ADC 78 samples the incoming I & Q baseband signals at 4 MHz (2× the required Nyquist rate). Open loop digital DC-offset calibration is distributed across the front-end by using current DACs (Digital to Analog Converters) in the active filter and PGAs. The I & Q baseband chips are then processed by the digital baseband processor 79.

Figure 8:
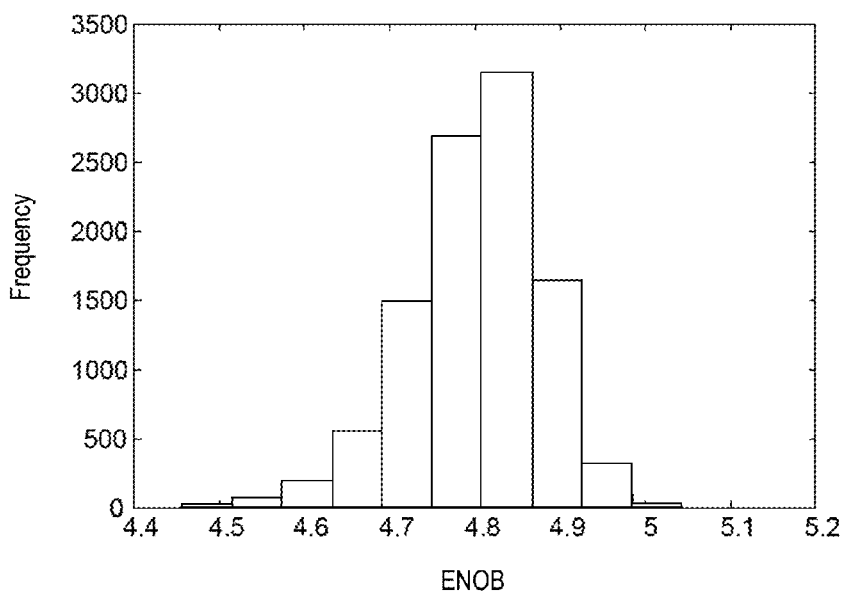
FIG. 8 is graph showing a simulated Matlab model for flash ADC ENOB.

From simulated BER curves, the 5-bit resolution of the flash ADC is determined to have negligible impact on the link performance. The comparator offset in a flash ADC is reduced to be less than LSB/4 by sizing the transistors of the input stage. A MATLAB model has been developed to evaluate the ENOB (Effective Number Of Bits) of the flash ADC for the comparator offset measured from Monte Carlo simulations. FIG. 8 shows that 4.8 bit ENOB is achievable for the flash ADC for the given comparator offset computed from simulations.

The proposed receiver is intended for short-range wireless communication so to extend the communication range the wireless nodes are expected to operate in a mesh network. The Friis equation (6) below can be used to calculate the maximum line-of-sight communication range between two sensor nodes. The measured receiver sensitivity from RF-to-bits at $10^{-3}$ BER is −52.5 dBm. Using the ISM band center frequency of 2.45 GHz and assuming a +7 dBm EIRP transmitter, the communication range corresponding to −52.5 dBm RX sensitivity is found to be 9.2 m.

$$\frac{P_r}{P_t} = G_t T_r \left(\frac{\lambda}{4\pi R}\right)^2 \tag{6}$$

To obtain the desired performance, the noise figure (NF), linearity and gain requirements of the receiver are calculated and summarized in Table 1 below.

| Parameter | Specifications for 2x Nyquist Rate | Specification for 50% 2x Nyquist Rate | Measured Results |
|---|---|---|---|
| SNR @ 1% PER | −2.2 dB | 0 db | — |
| Gain | 35.4 dB | 33.4 dB | 37 dB |
| NF | <47.6 dB | <45.6 db | 28 db |
| IIP3 | >−10 dBm | >−10 dBm | −14.5 dBm |
| IIP2 | >−39 dBm | >−39 dBm | −13.5 dBm |
| SFDR | >13 dB | >13 dB | 35 dB |
| Input power | −55 to −20 dBm | −55 to −20 dBm | −52.5 to −20 dBm |
| LPF | Third order, Fc = 1.5 MHz | Third order, Fc = 1.5 MHz | — |
| ADC resolution | >3.4 bits | >3.4 bits | 4.3 ENOB |
| Communication Range @ 7 dBm EIRP | 12.3 m | 9.8 m | 9.2 (Calcuated from Measured sensitivity) |

The Packet Error Rate (PER) is related to the Symbol Error Rate (SER) if acquisition effects are ignored by the relation.

$$SER = \frac{PER}{\text{symbols/packet}} \quad (7)$$

For IEEE 802.15.4, the number of bits in a packet is N=160 bits with 48 bits of overhead, this corresponds to 52 symbols in a packet and therefore 1% PER corresponds to 0.019% SER. A single symbol error would result in, on average, k/2 bit errors, where k=4 is the number of bits in a symbol. This corresponds to 0.0095% BER. The BER of O-QPSK modulation with half-sine pulse shaping is given by the Q-function (8) below.

$$P_e = Q\left(\sqrt{\frac{2E_b}{N_o}}\right) \quad (8)$$

Therefore for 0.0095% BER the required $(E_b/N_o)_{min}$ would be 8.8 dB.

Direct Sequence Spread Spectrum (DSSS) adds a Coding Gain (CG) and Processing Gain (PG). The coding CG is related to the degree of orthogonality for the code set, which for the DSSS code is calculated from the mean Hamming distance of the code set, $\bar{d}$. The code set for IEEE 802.15.4 is $R_{15.4}$ with a mean Hamming distance $\bar{d}=17$. For DSSS code sequences, the coding gain is approximately given by $$CG \approx 10\log_{10} k\left(\frac{\bar{a}}{n} - \frac{\ln 2}{\frac{E_b}{N_o}}\right) \quad (9)$$

where n is the length of the code. The CG is approximately 2 dB which reduces the required $(E_b/N_o)_{min}$ to 6.8 dB. The Processing Gain is calculated by the ratio of the chip rate to the data rate.

$$PG = 10\log_{10}\left(\frac{\text{Chip rate}}{\text{Data rate}}\right) \quad (10)$$

The chip rate is 2 Mcps and data rate is 250 Kbps that corresponds to PG of about 9 dB. The PG doesn't reduce the energy per bit required in contrast to CG but it's rather a measure of how much more energy is used to detect a bit as compared to the energy per chip ($E_S$). Hence the minimum $(E_S/N_o)_{min}$ required to achieve 1% PER considering CG and PG can be calculated which is −2.2 dB for the Nyquist rate sampling and about 0 dB for 50% sampling computed from MATLAB simulations as shown in FIG. 6.

For other receiver performance parameters, the ADC reference voltage is 300 mV, reference impedance is 50 Ohms, insertion loss for the RF band select filter is assumed to be 2 dB and the link margin is 10 dB. The NF of the receiver front-end is calculated by where BW is assumed to be 1.5 MHz.

$$NF_{max} = Rss - SNR_{min} - \text{Margin} + 174\left(\frac{\text{dBm}}{\text{Hz}}\right) - 10\log_{10} BW \quad (11)$$

where Rss is the target receiver sensitivity.

The IEEE 802.15.4 standard doesn't specify the linearity requirements of the receiver front-end. Hence the linearity requirements can be derived from the interferer profile. IIP3, IIP2 and SFDR are calculated as follows, $$IIP3 > \frac{(3P_{int} - P_{sig} + SNR_{min} + \text{Margin})}{2} \quad (12)$$

where $P_{int}$ is the power of the interferer and $P_{sig}$ is the power of the desired signal.

$$IIP > 2P_{int} - P_{sig} + SNR_{min} + \text{Margin} \quad (13)$$

$$SFDR = \frac{2}{3}(IIP3 - F) - SNR_{min} \quad (14)$$

F is the receiver noise factor.

The maximum and minimum gain required from the front-end assuming 5-bit ADC ($N_{ADC}$) and a Back Off (BO) margin of 10 dB is calculated as follows, $$G_{max} = REF_{ADC} - 6N_{ADC} + SNR_{min} - RSS + \text{Margin} \quad (15)$$

$$G_{min} = REF_{ADC} - R_{max} - BO \quad (16)$$

where $R_{max}$ is the maximum received power that is −20 dBm and $REF_{ADC}$ is the ADC reference voltage power relative to 50 Ohm. The theoretical link budget along with measured performance is shown in Table 1.

Figure 9:
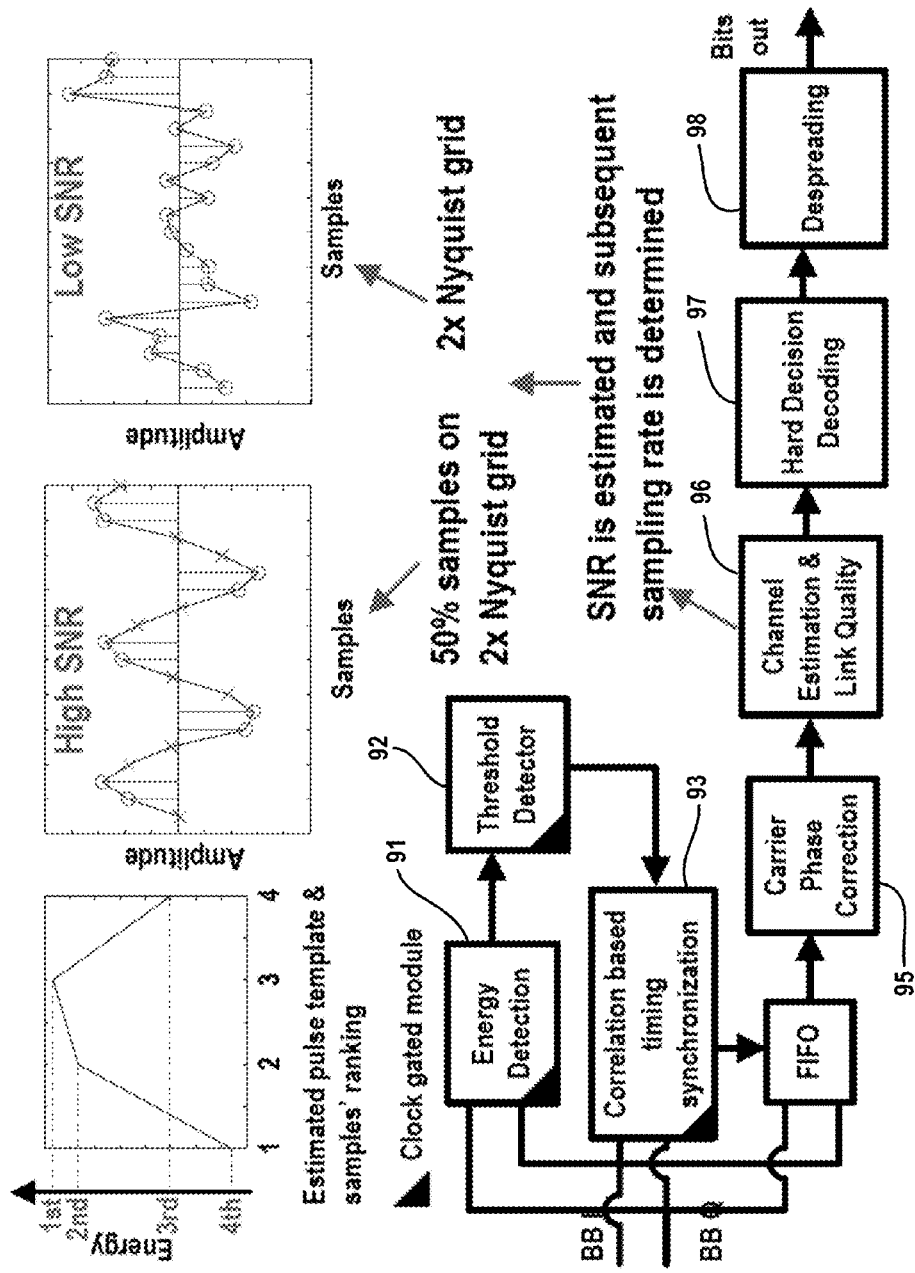
FIG. 9 is a block diagram of a simplified digital baseband implementing adaptive signal processing.

FIG. 9 illustrates a simplified digital baseband. The digital baseband waits in the idle state with an energy detection module 91 continuously computing the energy of the incoming baseband I & Q symbols. When the received symbol energy crosses a programmable threshold as detected by a threshold detection module 92, the digital baseband enters the acquisition and timing-synchronization state. The ideal square header template is used by the synchronization module 93 in correlations for achieving timing synchronization. After synchronization, the channel pulse template is computed by averaging 8-chips from the synchronization header. The averaged pulse template is then used to correlate the input I & Q data stream. For coherent demodulation, it is assumed that the receiver LO is frequency locked but not phase-locked with the transmitted 2.45 GHz RF carrier and thus the RF carrier phase offset is estimated and corrected from the received O-QPSK symbols by the phase correction module 95. This phase offset is calculated by computing the phase of the received O-QPSK symbols and comparing it with the known data transmitted in the synchronization header. A lookup table is used to calculate the phase angles and its corresponding correction factor.

In an example embodiment, the link quality module 96 implements the adaptive sampling technique set forth above. That is, the link quality module 96 determines a metric indicative of quality of data link over which the RF analog signal was received and sets the prescribed sampling rate to a value that is inversely related to the quality of the data link. In the example embodiment, the 4 MHz sampling rate corresponds to four samples per I & Q symbol. From the computed channel pulse response, the link quality module 96 ranks the four samples with respect to energy. This is conceptually illustrated in FIG. 9. By lowering the samples in the case of high SNR, some energy per symbol is traded off with reduced computational power in the following stages.

In one embodiment, digital clock gating is used in the digital baseband at the module level to save computational power. The digital clock is enabled for a module if it needs to process the current time sample from the ADC. The time samples are ranked in energy from the learned channel pulse template. The clock is enabled for a module only for the time samples corresponding to the highest energy samples consistent with the selected average sampling rate. In this way by reducing the average frequency of the digital processing unit, the total average power is reduced A decoding module 97 uses a matched-filter to perform hard decision decoding (HDD). HDD is used for lower computational complexity as compared to soft-decision decoding (SDD), with roughly a 2 dB penalty in link performance. Finally, the de-spreader module 98 despreads the received chips and outputs the raw binary data transmitted. For BER testing, the digital baseband enters into a state where it demodulates the data infinitely. Module level clock gating is used in the digital baseband to save power. As used herein, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Figure 10:
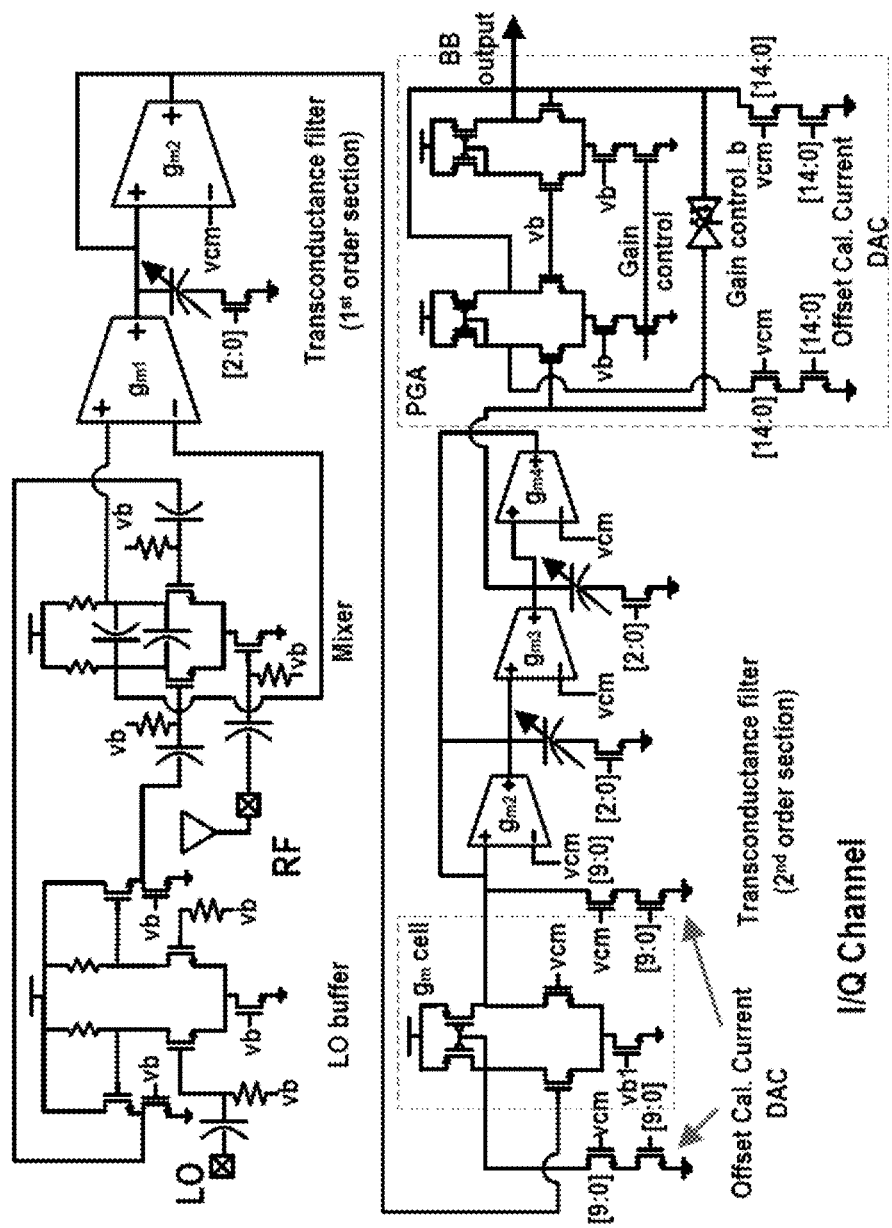
FIG. 10 is a schematic of an example RF front-end circuit.
Figure 11A:
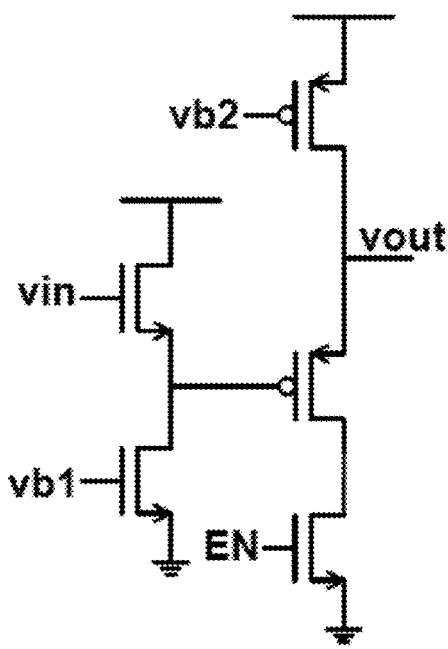
FIGS. 11A-11D are schematics of a buffer driving ADC circuit, comparator circuit, reference ladder circuit and SR latch circuit, respectively.
Figure 11B:
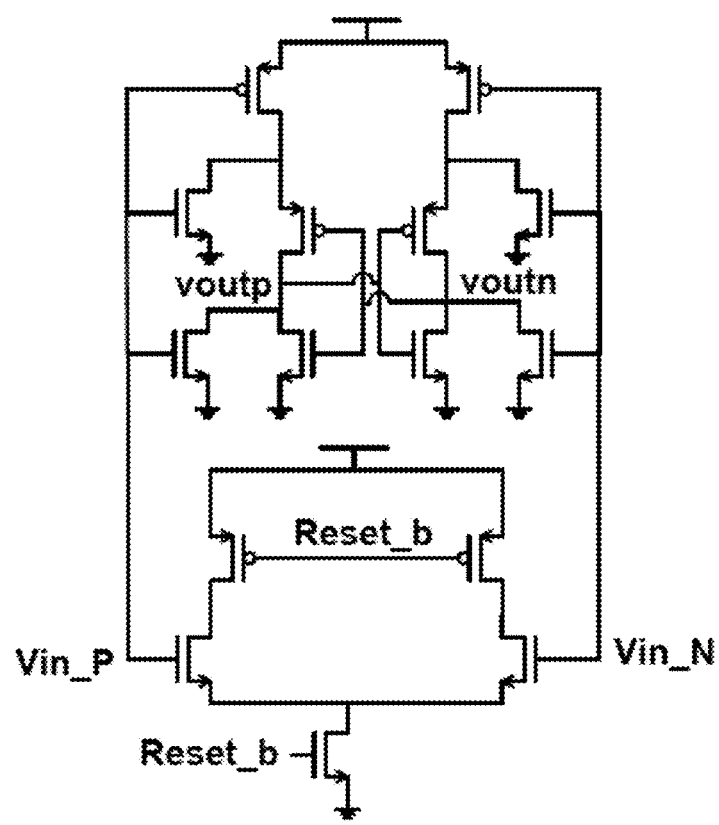
Figure 11C:
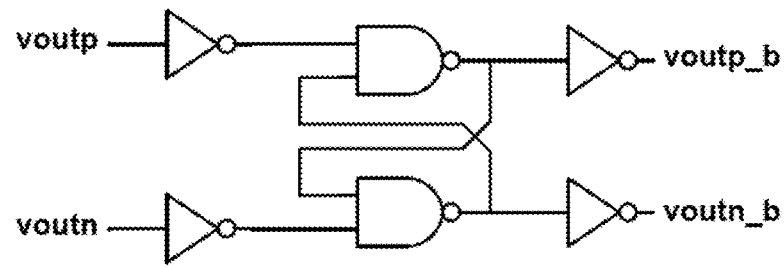
Figure 11D:
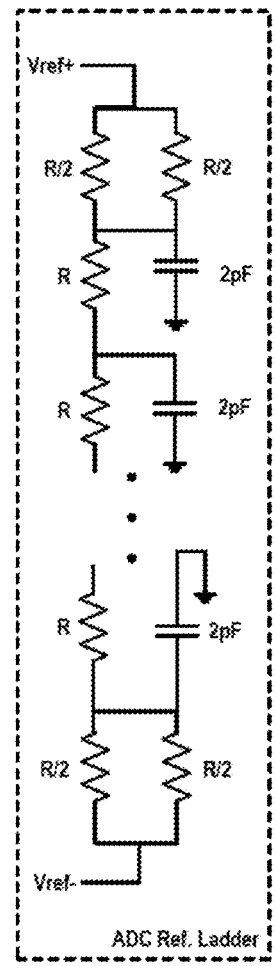

FIG. 10 is a detailed schematic of the I/O channel for an example RF front end with external LO and may be used in the received described above. Single-to-differential conversion of the LO signal is achieved using an on-chip LO buffer, the output of which is then AC coupled to a single-balanced gilbert-cell active mixer.

The LO buffer is a resistive loaded differential amplifier cascaded with a source follower for a DC level shift. To save power, the receiver doesn't use an LNA and instead relies on an active mixer to provide RF gain. Since the baseband modulated signal has significant low-frequency content, the devices in the active mixer are sized to reduce the flicker-noise corner frequency to <100 KHz.

The IEEE 802.15.4 PHY requires 0 dB rejection at the adjacent channel (±5 MHz) and 30 dB rejection at the alternate channel (±10 MHz). Assuming 10 dB margins, 40 dB rejection at the alternate channel can be achieved through the third-order Butterworth-type filter with corner frequency of 1.5 MHz. The filter will provide 50 dB rejection at 10 MHz apart from the wanted signal and thus can be used as the channel selection anti-aliasing filter. To adjust the corner frequency of the filter over process corners, the capacitors are made tunable by a 3-bit binary control word to vary capacitance by ±20%. The differential output of the mixer is converted into single-ended by the input stage of the gm-C filter.

In the example embodiment, the entire baseband is implemented single-ended to save power. The baseband gain is distributed between the active filter and the PGAs. Programmable gain (PG) is implemented by switchable fixed gain-stages.

The gain stage is implemented as a modified first order gm-C stage. A transmission gate is used which when enabled allows the input signal to bypass the gain stage which is being disabled by a footer. Each PG stage provides a gain of about 8 dB for a total PGAs' gain of roughly 24 dB. For distributed offset calibration, the current DACs are designed to reduce the DC-offset to within LSB/2 of the flash ADC. The output of the PG stages is fed into a buffer that drives the input capacitance of the flash ADC. S/H circuit is avoided at the input of the flash ADC considering that 1 MHz baseband signal isn't fast enough relative to the comparator speed in 65 nm CMOS to cause aperture errors. The LSB size is 9.4 mV for a reference voltage of 300 mV, generated off-chip. To reduce power, no pre-amplifier is used in the comparator that makes the flash converter susceptible to comparator kickback. To reduce comparator kick-back and the power consumption of the reference ladder, decoupling capacitors of 2 pF are added to the reference ladder as shown in FIG. 10. The output of the comparator is fed into an SR latch, also shown in FIG. 10. The digital baseband converts the thermometer code into binary and uses a simple adding encoders' technique to reduce bubble and sparkle errors of the flash ADC.

Figure 12A:
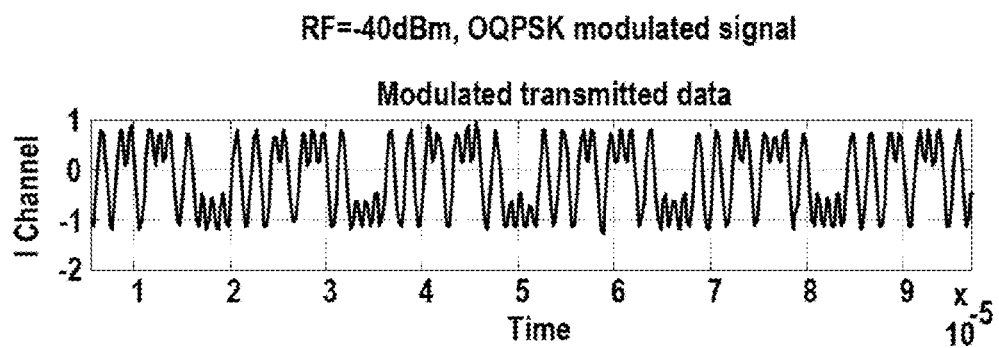
FIGS. 12A-12C are graphs showing the transmitted O-QPSK data on I channel, the down converted baseband signal at the output of the PGA and the flash ADC output for I channel for a −40 dBm RF input signal.
Figure 12B:
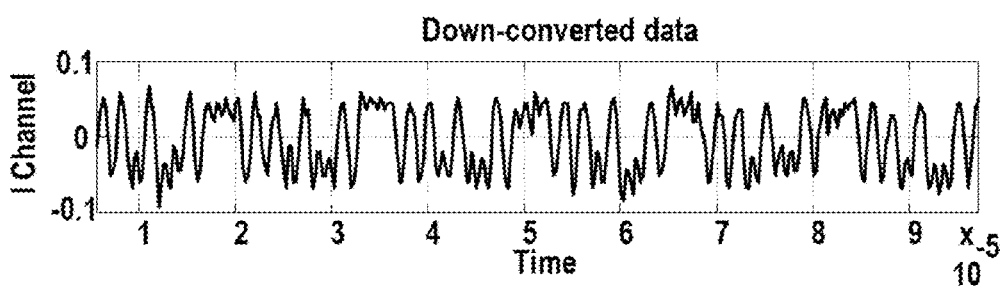
Figure 12C:
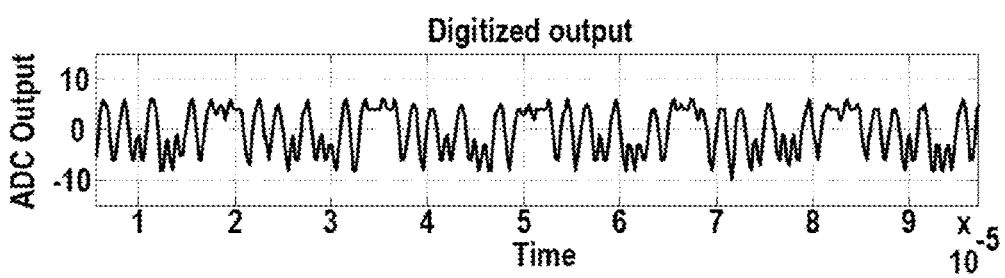
Figure 13A:
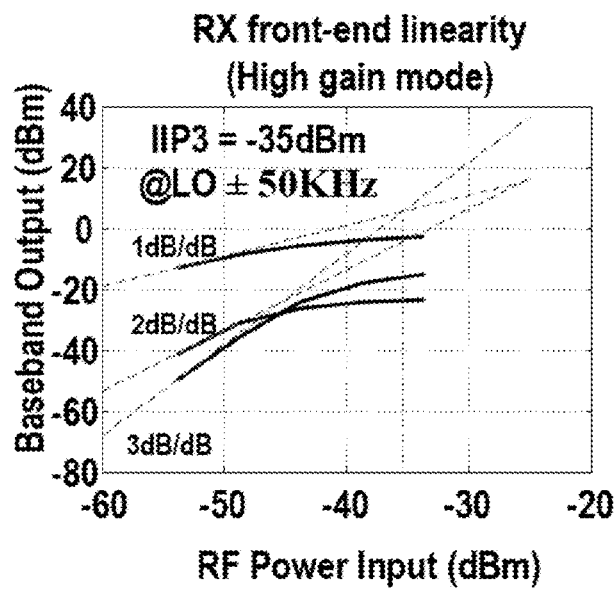
FIGS. 13A-13D are graphs showing measured gain, NF, IIP3, IIP2, of the receiver front-end and flash ADC spectrum, respectively.
Figure 13B:
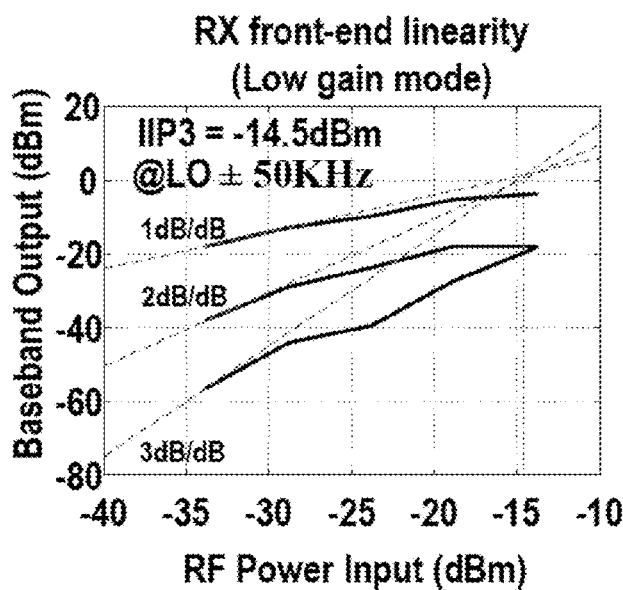
Figure 13C:
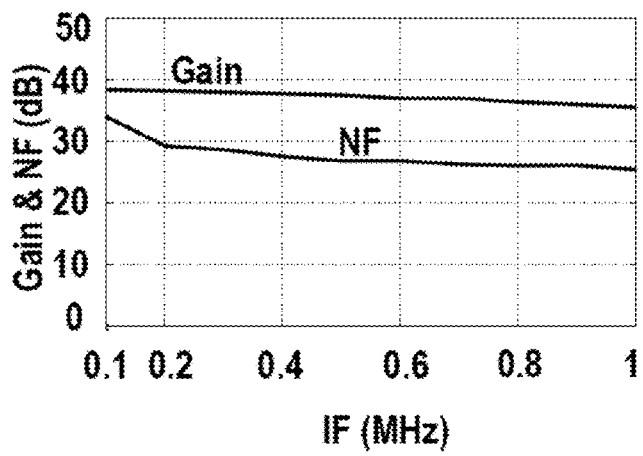
Figure 13D:
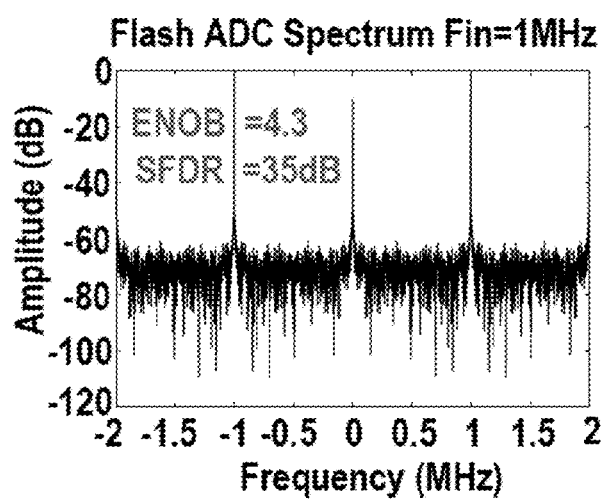

The example receiver described above is tested with IEEE 802.15.4 RF compatible packets. An off-chip LO power of −6 dBm and a 90° hybrid coupler is used to generate the quadrature LO signals. An FPGA is used to configure the scan-chain. FIGS. 12A-12C show the transmitted I channel modulated data, measured I channel analog baseband waveform along with the digitized output from the I channel ADC for a −40 dBm RF input signal. The transmitted and the received data waveforms are time-delayed and 180° out of phase. Since a coherent receiver is implemented, this phase shift is corrected in the digital baseband processor. FIGS. 13A-13D show the measured performance of the RF front-end along with the flash ADC spectrum. The flash ADC achieves an ENOB of 4.3 at the input frequency of 1 MHz. The total average gain over the IF bandwidth of 1 MHz is 37 dB while the average NF is 28 dB. The measured average NF is about 10 dB lower than the simulated value. This is because the receiver noise is dominated by 1/f flicker noise, which is not accurately modeled in simulations. For linearity measurements, a two-tone test at (LO±50 KHz) shows the measured IIP3 at high-gain and low-gain setting as −35 dBm and −14 dBm, respectively, and the measured IIP2 at high-gain and low-gain setting as −25 dBm and −13.5 dBm, respectively.

FIG. 14 shows the received RF packets for −40 dBm RF input signal. A dummy PHY payload of binary data $1001_2$ is used for the test. The IEEE 802.15.4 standard compliant packet is also shown in the figure. SFD is the start-of-frame delimiter, which is used for frame synchronization.

FIGS. 15A-15D shows the measured energy efficiency profile of the entire system along with simulated energy efficiency breakdown of the radio, the BER curve and the radar plot of the most desirable RX metrics for comparison. In the radar plot, a bigger star represents a superior design. This plot highlights how communication distance has been traded-off for improved energy efficiency and battery life. The measured energy efficiency of the RF-frontend alone is 3.5 nJ/bit while it is 2.3 nJ/bit for the ADC and the DBB.

For a BER test, the digital baseband enters into a state where it receives the data infinitely. The measured sensitivity of the RX is −52.5 dBm at $10^{-3}$ BER. From the measured BER performance, it is observed that if the input SNR is about 3 dB higher at 2× the Nyquist sampling than for the same link performance of $10^{-3}$ the DBB can be operated at 25% samples with an energy efficiency of 2.1 nJ/bit.

For a complete solution, the receiver would require an on-chip LO. In order to estimate total power, we draw from previously published LOs. A 2.4 GHz LO generated using a PLL consumed 1.6 mW including the PLL, LC-VCO and VCO buffer and 1.2 mW for an entire QVCO [23]. This corresponds to roughly total power of 3 mW for a complete receiver, including this work. This receiver has 2× better energy efficiency for the radio front-end (3.5 nJ/bit) than previous approaches, while reporting 8.1 nJ/bit energy efficiency for an O-QPSK DSSS coherent receiver with near-threshold digital baseband.

Radio energy efficiency is going to play a key role in extending the battery life of future IoT devices. Different design tradeoffs can be made for these emerging applications as compared to the conventional high performance radios. We have explored the sensitivity vs. power tradeoff and have presented a low-power (2 mW) short-range O-QPSK DSSS receiver with integrated digital baseband. The radio receiver also adapts its average sampling rate for high input SNR while still maintaining the target link performance of $10^{-3}$ BER to save power in the digital baseband.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for operating a short-range receiver with a digital baseband processor, comprising:
    receiving, by a RF front-end circuit in the receiver, a network data packet over a data link of a wireless network;
    sampling, by an analog-to-digital converter, a portion of the network data packet at a given sampling rate;
    determining, by the digital baseband processor, a metric indicative of quality of the data link over which the network data packet was received;
    lowering, by the digital baseband processor, the given sampling rate of the network data packet to a reduced uniform or non-uniform sampling rate, where the reduced sampling rate is set inversely to quality of the data link and has a value lower than the given sampling rate; and
    processing, by the digital baseband processor, remainder of the network data packet at the reduced sampling rate, wherein lowering the given sampling rate further comprises disabling the analog-to-digital converter for a portion of the sampling interval and disabling at least one other active circuit in the receiver for the portion of the sampling interval.

2. The method of claim 1 wherein the portion of the network data packet is further defined as a header of the network data packet.

3. The method of claim 1 wherein the given sampling rate is defined by a Nyquist rate.

4. The method of claim 1 wherein the metric is selected from a group consisting of a signal-to-noise ratio, a received signal strength index and a link quality indicator.

5. The method of claim 1 wherein lowering the given sampling rate further comprises
    comparing the metric to a threshold;
    lowering the given sampling rate to the reduced sampling rate and processing the remainder of the network data packet when the metric is above a threshold; and
    processing the remainder of the data unit at the given sampling rate when the metric is below the threshold.

6. The method of claim 1 wherein lowering the given sampling rate further comprises
    ranking samples from the portion of the network data packet according to energy level;
    selecting a subset of the samples having highest energy level, where the number of selected samples correlates to the reduced sampling rate; and
    sampling the remainder of the network data packet in accordance with the selected subset of samples.

7. The method of claim 1 further comprises receiving another network data packet at the receiver and repeating the steps of the method for the another network data packet.

8. The method of claim 1 further comprises monitoring the quality of the data link and continue processing additional network data packets at the reduced sampling rate until the quality of the data link changes.

9. The method of claim 8 further comprises detecting a change in quality of the data link, determining the metric indicative of quality of the data link, and setting the given sampling rate to a value that is inversely related to quality of the data link.

10. A method for operating a short-range receiver with a near-threshold digital baseband processor, comprising:
    receiving, by the receiver, a protocol data unit over a channel in a wireless network;
    sampling, by the receiver, a portion of the data unit at a given sampling rate;
    determining, by the receiver, a metric indicative of quality of the channel over which the data unit was received;
    comparing, by the receiver, the metric to a threshold;
    processing the remainder of the data unit at a reduced uniform or non-uniform sampling rate when the metric is above the threshold, where the reduced sampling rate is lower than given sampling rate and the processing of the remainder of the data unit at the reduced sampling rate includes
        ranking samples from the portion of the data unit according to energy level;
        selecting a subset of the samples having highest energy level, where the number of selected samples correlates to the reduced sampling rate;
        sampling the remainder of the network data packet in accordance with the selected subset of samples; and
    processing the remainder of the data unit at the given sampling rate when the metric is below the threshold.

11. The method of claim 10 wherein the portion of the data unit is further defined as a synchronization header of a data unit.

12. The method of claim 10 wherein the given sampling rate is defined by a Nyquist rate.

13. The method of claim 10 wherein the metric is further defined as a signal-to-noise ratio.

14. The method of claim 10 further comprises repeating the steps of the method for each new protocol data unit received.

15. The method of claim 10 further comprises monitoring the quality of the channel and continuing to process additional data units at the reduced sampling rate until the quality of the channel changes.

16. The method of claim 15 further comprises detecting a change in quality of the channel, determining the metric indicative of quality of the channel, and setting the given sampling rate to a value that is inversely related to quality of the channel.

17. A short-range receiver operating in a wireless network, comprising:
- an RF front-end circuit configured to receive an RF analog signal from an antenna and operates to shift the RF analog signal to an intermediate signal having a different frequency;
- an analog-to-digital converter configured to receive the intermediate signal from the RF front-end circuit and convert the intermediate signal to a digital signal; and
- a digital baseband processor configured to receive the digital signal from the analog-to-digital converter and processes the digital signal at a prescribed sampling rate, the baseband processor includes
  - a link quality module that determines a metric indicative of quality of data link over which the RF analog signal was received and set the prescribed sampling rate to a value that is inversely related to the quality of the data link; and
  - a decoder that samples the digital signal at the prescribed sampling rate and outputs a sequence of data bits derived from the digital signal, wherein the link quality module implements the prescribed sampling rate by disabling operation of the analog-to-digital converter for a portion of the sampling interval and disabling operation of at least one other active circuit in the receiver for the portion of the sampling interval.

* * * * *